United States Patent
Cibie

[15] 3,677,299
[45] July 18, 1972

[54] HYDRAULIC CIRCUITS

[72] Inventor: Pierre Cibie, Paris, France
[73] Assignee: Projecteurs Cibie
[22] Filed: July 31, 1970
[21] Appl. No.: 59,878

[30] Foreign Application Priority Data

Aug. 5, 1969 France..................................6926812

[52] U.S. Cl................................................138/26, 138/28
[51] Int. Cl........................................F16l 55/04, E03b 7/10
[58] Field of Search.......................60/54.5, 54.6 R, 54.6 M; 251/57; 138/26, 27, 28, 39, 118

[56] References Cited

UNITED STATES PATENTS 3,135,322  6/1964  Neugebauer............................165/95
3,013,392  12/1961  Falge et al...........................60/54.6 M

FOREIGN PATENTS OR APPLICATIONS 1,467,176  12/1965  France
1,358,632  3/1963  France

*Primary Examiner*—Martin P. Schwadron
*Assistant Examiner*—A. M. Zupcic
*Attorney*—Breitenfeld & Levine

[57] ABSTRACT

A hydraulic control circuit particularly for use in motor vehicles for the orientation of headlamps in which there is a flexible tube enclosing a transmission medium whereof the volumetric coefficient of expansion is equal to three times the linear expansion of the tube. This transmission medium consists of a number of solid elements located end-to-end within the tube and being surrounded by a hydraulic liquid which fills the spaces between the tube and the solid elements. These elements are contiguous or joints and their contacting surfaces are rounded to permit relative rolling. The solid elements may be cylindrical with rounded ends or spheres.

8 Claims, 1 Drawing Figure

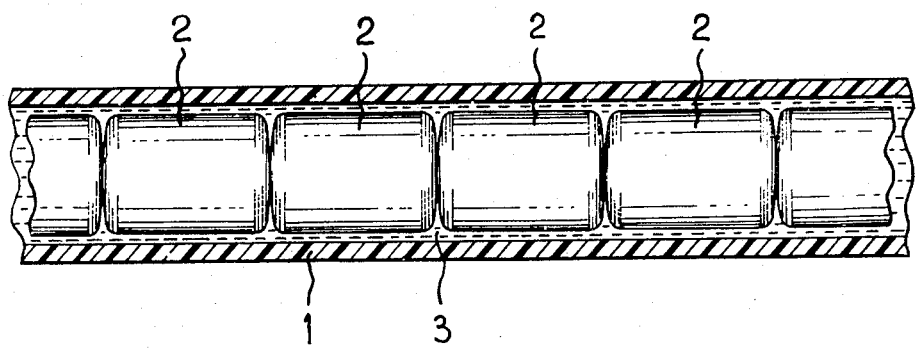

HYDRAULIC CIRCUITS

This invention relates to hydraulic control circuits adapted for the transmission of hydraulic pressure with possible circulation of liquid from one end of the circuit to the other.

In such hydraulic circuits it is often necessary to provide arrangements to take into account differences of expansion between the hydraulic liquid and the tubes or pipes which contain it when the circuits are subjected to substantial temperature variations.

More particularly the present invention is concerned with hydraulic circuits on motor vehicles and particularly hydraulic circuits for the hydraulic control of the orientation of headlamps. Such circuits are disclosed, for example, in French Pat. Nos. 1,358,632 and 1,418,215.

A hydraulic control circuit for the orientation of headlamps must have a very precise control the admissible error being only of the order of 0.5 percent. It is to be noted that such a hydraulic circuit on a motor vehicle is subjected to variations of temperature non-uniformly distributed from one end of the circuit to the other: certain parts of the circuit near the engine are heated while other parts located at ventilated locations can be cold.

It is thus essential that such hydraulic circuits are compensated for temperature variations, ambient as well as local, so as not to diminish the high precision necessary for transmission.

In French Pat. No. 1,467,176 there is disclosed a hydraulic control circuit comprising a tube filled with a liquid, characterized in that the volumetric coefficient of expansion of the liquid is appreciably equal to three times the linear coefficient expansion of the tube, so that at any point in the circuit the expansion of the tube compensates for expansion of liquid, the precision in control of the circuit thus being independent of ambient and local temperatures.

In such a known circuit, compensation is thus obtained by equalizing the expansion of the enclosing tube and its contents in the direction of length of the tube.

In the particular operation of such circuits there are, however, a certain number of difficulties due to the fact that it has been established that it is difficult to provide at one and the same time a liquid and material for the tube compatible as regards expansion, sufficiently cheap and lending themselves to the construction of a hydraulic circuit.

According to the present invention these difficulties are resolved by enclosing in the tube a complex content comprising at one and the same time, a liquid and solid elements such that the ambient coefficient of expansion of the tube content expands in the required manner relative to the enclosing tube. Further, to avoid segregation while conserving to the hydraulic circuit the necessary flexibility, which circuit comprises a flexible enclosing tube, the solid elements are massive elements laid end-to-end with rounded contiguous surfaces, for example, cylinders with rounded ends or spheres, and they are disposed in file within the enclosing tube.

The massive or large elements can be made either of glass or metal. Preferably, however, they are formed of a ceramic having a coefficient of expansion which is practically negligible relative to the surrounding liquid, for example, a ceramic having a linear coefficient of expansion from 3 to 5 $10^{-60}$ per degree Centigrade. Such ceramics are commercially available.

With such ceramics there can be employed a tube of superpolyamide of the Rilsan type in which case the liquid is preferably a mineral oil. There can also be used an enclosing tube of low pressure polyethylene, in which case the liquid is preferably a mixture of water and glycol, particularly a 50—50 mixture of water and glycol.

An embodiment of the present invention will now be described, by way of example with reference to the single FIGURE of the accompanying drawing which shows, in section, one circuit member with expansion compensation according to the invention.

The circuit comprises a flexible enveloping tube 1. In the tube 1 are located a series of massive cylindrical elements 2 whereof the ends, slightly rounded, are contiguous or joined. The hydraulic transmission liquid 3 fills all the tube volume remaining free between the elements 2. The material of the elements 1, 2 and 3 is selected as indicated above.

It must be noted that such a construction permits a very simple compensation using traditional liquids in the field of hydraulic transmission; further, the use of rounded elements (cylinders as shown or spheres) allows the circuit thus formed to be substantially deformed, the massive elements rolling one on the other when the tube is subjected to a bending action.

What is claimed is:

1. A hydraulic circuit comprising a hollow flexible tube along the length of which hydraulic pressure is to be transmitted, a series of solid elements extending longitudinally within said tube, each of said solid elements being contiguous with the elements immediately ahead of and behind it in the series, said solid elements being movable with respect to each other while remaining contiguous in a way which allows said tube to be flexed, and a hydraulic liquid filling the portion of the interior of said tube not occupied by said solid elements, the coefficients of expansion of said liquid and solid elements being so related to the coefficient of expansion of said tube that substantially no hydraulic pressure is transmitted along said tube solely due to variations in the ambient temperature surrounding the hydraulic circuit.

2. A hydraulic circuit according to claim 1, in which the tube is formed of a superpolyamide, the massive elements of a ceramic and the liquid being a mineral oil.

3. A hydraulic circuit according to claim 1, in which the tube is formed of polyethylene, the massive elements of a ceramic and the liquid being a water-glycol mixture.

4. A hydraulic circuit as defined in claim 1 wherein each of said solid elements occupies a majority of the cross-sectional area of the tube portion in which it is located.

5. A hydraulic circuit as defined in claim 4 wherein said solid elements are of generally cylindrical shape.

6. A hydraulic circuit as defined in claim 1 wherein the volumetric coefficient of expansion of said liquid is about equal to three times the linear coefficient of expansion of said tube, and the coefficient of expansion of said solid elements is negligible with respect to said liquid.

7. A hydraulic circuit as defined in claim 1 wherein the surfaces of said elements which engage adjacent elements are rounded.

8. A hydraulic circuit as defined in claim 1 wherein said solid elements are of generally cylindrical shape and arranged in end-to-end relationship, the ends of said elements being rounded.

* * * * *